US010528627B1

(12) United States Patent
Dunsmore

(10) Patent No.: US 10,528,627 B1
(45) Date of Patent: Jan. 7, 2020

(54) UNIVERSAL SEARCH SERVICE FOR MULTI-REGION AND MULTI-SERVICE CLOUD COMPUTING RESOURCES

(71) Applicant: Amazon Technologies, Inc., Seattle, WA (US)

(72) Inventor: Devlin Roarke Campbell Dunsmore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 915 days.

(21) Appl. No.: 14/852,448

(22) Filed: Sep. 11, 2015

(51) Int. Cl.
*G06F 16/22* (2019.01)
*G06F 16/951* (2019.01)
*H04L 29/08* (2006.01)
*H04L 12/24* (2006.01)
*G06F 16/23* (2019.01)

(52) U.S. Cl.
CPC ........ *G06F 16/951* (2019.01); *G06F 16/2272* (2019.01); *H04L 41/069* (2013.01); *H04L 67/1097* (2013.01); *G06F 16/2322* (2019.01)

(58) Field of Classification Search
CPC ... G06F 17/30312–30607; G06F 3/065; G06F 3/067; G06F 11/1453; G06F 11/2094; G06F 2201/08–84; G06F 16/27; G06F 16/178; G06F 16/23–2329; H04L 67/10; H04L 67/42; H04L 67/1002; H04L 67/1095; H04L 67/1097
See application file for complete search history.

(56) References Cited

U.S. PATENT DOCUMENTS

| | | | | |
|---|---|---|---|---|
| 7,680,831 | B1 * | 3/2010 | Gandhi | H04L 41/0654 707/999.2 |
| 7,685,109 | B1 * | 3/2010 | Ransil | G06F 17/30336 707/999.003 |
| 9,740,606 | B1 * | 8/2017 | McKelvie | G06F 12/0238 |
| 9,760,480 | B1 * | 9/2017 | McKelvie | G06F 12/0246 |
| 9,767,015 | B1 * | 9/2017 | McKelvie | G06F 12/0238 |
| 9,892,142 | B2 * | 2/2018 | Zagelow | G06F 17/30336 |
| 2005/0187992 | A1 * | 8/2005 | Prahlad | G06F 11/1435 |
| 2006/0224638 | A1 * | 10/2006 | Wald | G06F 17/30377 |
| 2007/0168336 | A1 * | 7/2007 | Ransil | G06F 17/3089 |
| 2007/0214193 | A1 * | 9/2007 | Takahashi | H04L 41/0813 |
| 2007/0233775 | A1 * | 10/2007 | Jackson | G06F 9/545 709/201 |
| 2008/0172371 | A1 * | 7/2008 | Clark | G06F 17/30867 |

(Continued)

*Primary Examiner* — David R Lazaro
*Assistant Examiner* — Julian Chang
(74) *Attorney, Agent, or Firm* — Patterson + Sheridan, LLP

(57) ABSTRACT

Embodiments presented herein provide a multi-region search service to customers of a cloud computing service provider. The search service allows cloud based computing resources deployed across multiple services and across multiple regions in which services are deployed to be rapidly identified. Search queries (such as simple free text or structured conditions) are evaluated across all of the cloud based services in all regions hosted by a service provider to identify a set of computing resources instantiated (or otherwise controlled) by a common account owner. To maintain the search index, the search service may include an event poller which deduplicates change events written to a staging database. In turn, an index writer performs batch updates to partitions of the search index using records pulled from the staging database.

20 Claims, 8 Drawing Sheets

(56) References Cited

U.S. PATENT DOCUMENTS

| | | | |
|---|---|---|---|
| 2011/0040737 A1* | 2/2011 | Guldner | G06F 17/30356 707/695 |
| 2011/0213765 A1* | 9/2011 | Cui | G06F 17/30864 707/711 |
| 2011/0225165 A1* | 9/2011 | Burstein | G06F 17/30336 707/741 |
| 2012/0130973 A1* | 5/2012 | Tamm | G06F 17/30545 707/706 |
| 2012/0259824 A1* | 10/2012 | Zagelow | G06F 17/30336 707/696 |
| 2013/0110828 A1* | 5/2013 | Meyerzon | G06F 17/30864 707/728 |
| 2013/0198130 A1* | 8/2013 | Resch | G06F 17/30106 707/609 |
| 2013/0275376 A1* | 10/2013 | Hudlow | H04L 67/34 707/639 |
| 2013/0275975 A1* | 10/2013 | Masuda | G06F 9/5077 718/1 |
| 2014/0129698 A1* | 5/2014 | Seago | G06F 9/542 709/224 |
| 2014/0245290 A1* | 8/2014 | Gupta | G06F 8/61 717/178 |
| 2015/0067678 A1* | 3/2015 | Naseh | G06F 9/45558 718/1 |
| 2015/0229715 A1* | 8/2015 | Sankar | H04L 41/0893 709/203 |
| 2015/0254303 A1* | 9/2015 | Saadat | G06F 17/30463 707/716 |
| 2015/0356314 A1* | 12/2015 | Kumar | G06F 17/30336 713/165 |
| 2015/0358417 A1* | 12/2015 | Patil | G06F 12/0804 709/219 |
| 2016/0203174 A1* | 7/2016 | Shahane | G06F 17/30321 707/803 |
| 2016/0205218 A1* | 7/2016 | Tan | H04W 4/021 709/221 |
| 2016/0241438 A1* | 8/2016 | Sundaram | H04L 41/0806 |
| 2016/0248590 A1* | 8/2016 | Benson | G06F 21/00 |
| 2016/0267105 A1* | 9/2016 | Sun | G06F 17/30088 |
| 2016/0292171 A1* | 10/2016 | Bhagat | G06F 17/30094 |
| 2016/0292192 A1* | 10/2016 | Bhagat | G06F 17/30292 |
| 2016/0308940 A1* | 10/2016 | Procopio | G06F 17/30144 |
| 2017/0004323 A1* | 1/2017 | Balachandran | G06F 17/30091 |
| 2017/0052851 A1* | 2/2017 | Sudarsanam | G06F 17/30088 |
| 2017/0177733 A1* | 6/2017 | Meyerzon | G06F 17/30867 |
| 2017/0364540 A1* | 12/2017 | Sigler | G06F 17/30321 |
| 2017/0371778 A1* | 12/2017 | McKelvie | G06F 11/1471 |

* cited by examiner

UNIVERSAL SEARCH SERVICE FOR MULTI-REGION AND MULTI-SERVICE CLOUD COMPUTING RESOURCES

BACKGROUND

Cloud computing has become a widely adopted model for providing enterprises with access to large amounts of computing resources. One of the primary technologies underlying cloud computing is virtualization. Virtualization allows a single physical computing server to host multiple virtual machine instances each of which operates as an independent computing system with its own operating system. Virtual machine instances frequently provide a broad variety of computing services, e.g., a retail shopping website backed by virtual machine instances running web-servers, application servers, and database applications. In this way, cloud computing allows an enterprise to obtain a variety of computing resources as needed without having to invest and maintain an underlying physical computing infrastructure.

In addition to providing virtual machine instances, a cloud computing provider typically offers a variety of other computing resources to enterprise clients. For example, the service provider may offer database services, persistent storage, private networking services for VM instances, load balancing, auto scaling, cloud formation, etc., as part of a cloud based services offering. Cloud providers typically offer such computing resources using web services. Generally, a web service provides an application made available over the internet which communicates with endpoints and other services using standardized messaging protocols. For example, an enterprise customer may invoke API calls exposed by the service provider to launch, configure, access, and manage cloud based computing resources as needed (e.g., by composing applications which invoke API calls or using a service console or command line tool which invokes such API calls).

While virtual machine instances are frequently referred to as existing "in the cloud," many providers offer cloud based computing resources for defined regions. For example, a cloud based provider may allow users to launch computing resources in specific regions. Such regions may be geographically based (e.g., Western United States and Eastern United States) as well as based on political boundaries (e.g., North America U.S. versus North America Canada).

BRIEF DESCRIPTION OF DRAWINGS

Various embodiments in accordance with the present disclosure will be described with reference to the drawings, in which.

DETAILED DESCRIPTION

Figure 1:
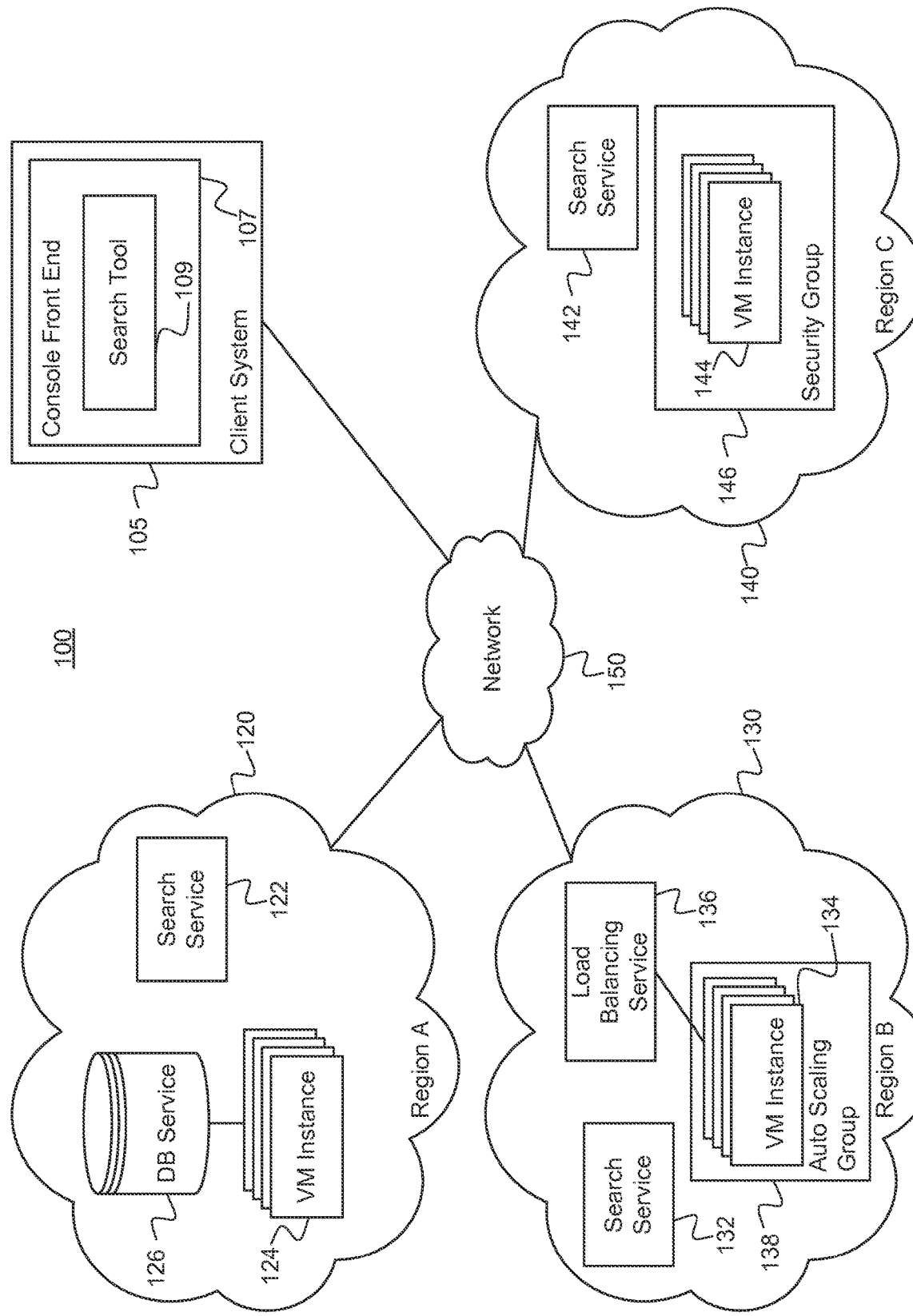
FIG. 1 illustrates an example of a cloud based computing environment hosting computing resources for a common account in multiple regions, according to one embodiment.

While the number of regions and services offered by cloud based computing service providers continues to grow, it becomes challenging for large enterprise customers to manage a fleet of computing resources across multiple regions. For example, while service providers often provide a service console or management tool for cloud based computing resources, such tools, and the underlying APIs, are typically configured to manage each distinct computing resource type individually on a per-region basis. That is, to inspect or identify a fleet of computing resources belonging to a given account (e.g., virtual machine instances, data storage and networking services, relational database tables and services, message queueing services, load balancing services, auto-scaling services, etc.), an enterprise customer has to use the underlying management tool (or APIs) for each computing resource individually and has to do so separately for each region where resources may have been deployed. Thus, enterprise customers which manage multi-region fleets of cloud based computing resources have to compose custom search tools that invoke APIs for each service in each region individually. The result is a slow experience for large fleets and an approach that does not scale as new services and regions are added by the cloud based service provider.

Embodiments presented herein provide a search service which allows an account owner to identify cloud based computing resources associated with a given account across multiple services and across multiple regions in which services are provided. As described below, the search service allows an account owner to submit search queries (simple free text or structured) which are evaluated across all of the cloud based services in all regions hosted by a service provider to rapidly identify a set of computing resources. For example, a user can submit a query to a search service in any region (or specified regions) using a management console (or via API call). In response, the search service returns a list of matching resources across all services and regions. Search queries can also include more complex conditions used to identify computing resources which have a relationship specified in the request, e.g., a search request to find all VM instances which are members of a security group and tagged "production" or a search request to find all resources in a security group regardless of the type of computing resource.

In one embodiment, the search service returns a set of resource snapshots, which each include metadata about one of the computing resources in the search results, such as metadata associated with a given resource type as well as relationships that one resource may have with others. The search result may also include metadata identifying how to access the resource directly using a management console or an API call, e.g., by including a resource ID and region ID.

Further, a search service frontend (e.g., the management console or web-based access point) may be configured to provide more detailed information about the computing resources identified in the search results in response to user interaction. For example, the search service may invoke APIs to interrogate a selected computing resource directly or launch the appropriate service frontend associated with that computing resource. In one embodiment, the search service may be integrated as a component of a cloud based management console as well as support an API and SDK, allowing customers to integrate the search service into custom applications developed to manage a fleet of cloud based computing resources across services and regions.

In one embodiment, the search service in each region maintains a read-optimized index of resource snapshots about each computing resource in that region. The index may be partitioned across a customer account base and include replicas of the respective snapshots associated with each partition. To maintain the index, the search service may include an event polling component, a staging database, and an index writing component. The event polling component subscribes to a messaging service in order to receive change event data related to the computing resources in a region. The messages capturing change event data may be published by a config service which parses log trails for each resource type to identify change events.

The event polling component writes change events to the staging database. The staging database provides a batch record data store for records to be written to the search index. In one embodiment, the event polling component may coalesce multiple change events related to the same computing resource, resulting in only a "final" state of the computing resource to be stored in the staging database, instead of storing a distinct record for incremental changes that occur prior to a record in the staging database being written to the search index. In turn, the index writer batches records from the staging database and writes them to the search index.

The search service may also include a data partition manager that identifies which regions each account has deployed any computing resources to that can be found using the search service. The data partition manager may be replicated and maintained across each region. In one embodiment, the search service in one region uses the data partition manager to identify the other regions that should be queried to process a given query. If the data partition manager indicates a given account may have computing resources deployed in other regions, the search service communicates with the peer search services in the other regions to complete processing a given query.

Advantageously, maintaining an index based search service optimizes data access speed in processing search requests, as well as allows users to access data from new resource types, services, and regions immediately upon launch, without having to refactor the search service provided by the cloud computing provider or custom search services developed by an enterprise customer. Thus, as a cloud based provider continues to expand a suite of services and regions, the search service can assist customers in managing new resources and services as well as in managing resources in new regions, without incurring substantial additional overhead.

FIG. 1 illustrates an example of a cloud based computing environment 100 hosting computing resources in multiple regions for a common account, according to one embodiment. As shown, the computing environment 100 includes a client computing system 105 and three cloud computing regions—region A 120, region B 130, and, region C 140. Each region 120, 130, and 140 generally corresponds to a region defined by a service provider in offering cloud based computing services to customers. Accordingly, customers may provision, launch, and manage virtualized computing resources within the computing cloud provided by each region. The deployment and management of the computing resources in each region is generally isolated from others. While cloud computing regions 120, 130, and 140 may be drawn along any arbitrary boundary, cloud computing regions often correspond to geographic or national boundaries.

For this example, assume the same enterprise customer has deployed a set of computing resources in each of the regions 120, 130, and 140 as well as defined relationships, group memberships, identity and access permissions, tags, and metadata describing some of the computing resources. Illustratively, region A 120 includes a group of virtual machine (VM) instances 124 which access a database service 126 provided by a cloud based provider. For example, VM instances 124 could access and maintain product data and website content related to products offered for sale at a website run by the enterprise customer and stored by the database service 126. Region B 130 includes a group of virtual machine (VM) instances 134 which process requests distributed by a load balancing service 136. In this example, the count of the VM instances 134 scales on demand using an auto-scaling group 138 defined by the enterprise customer. Continuing with the example of an online retailer, VM instances 134 could each host a web server configured to serve a retail website, allowing customers to view, select, and purchase goods. At times of high demand, e.g., during the holiday season, the auto-scaling group 138 launches additional VM instances 134 using criteria specified by the enterprise customer. Region C 140 includes a group of virtual machine (VM) instances 144 which are members of security group 146. Continuing with the example of an online retailer, VM instances 144 could run applications for transaction processing, inventory, fulfillment, and accounting for the online retailer. The security group 146 may provide a virtual firewall that controls traffic to and from VM instances 144. In addition, the retailer could specify a variety of identify and access management rules or permissions regarding what users are authorized to access, control, or search for computing resources, such as VM instances 124, 134, and 144. While the computing resources in the regions 120, 130, and 140 are generally isolated from one another, the enterprise customer could configure additional computing resources supported by the provider, such as a virtual private cloud (VPC), to define a common logical network connecting the computing resources in each of the regions 120, 130, and 140.

Client system 105 provides a computing system used to manage the virtualized computing resources deployed by the enterprise customer in the computing clouds of regions 120, 130, and 140 (e.g., the VM instances, auto-scaling groups, load balancing service, network, and database services, etc.). Client system 105 is included to be representative of a general purpose computing system such as desktop computer and laptop computer systems, as well as representative of mobile computing devices such as tablets and smart phones configured with service console applications or web browser software.

As shown, the client system 105 includes a console front end 107, which itself includes a search tool 109. The console front end 107 provides an application (or web-based access point) which allows the enterprise customer to manage the computing resources in regions 120, 130, and 140. For example, the enterprise customer could use the console front end 107 to access the VM instances 124 in region A 120, e.g., by providing the customer with a remote desktop to view and control one of the VM instances 124. Similarly, the console front end 107 could be used to add additional VM instances 124 or provision and deploy additional virtual computing resources in region A 120. Similarly, the console front end 107 could be used to access, provision, and manage computing resources in region B 130 and Region C 140.

As shown, region A 120 includes a search service 122, region B 130 includes a search service 132, and region C 140 includes a search service 142. As described below, the search tool 109 allows the enterprise customer to search for computing resources across different service types and regions, regardless of the region or search service the console front end 107 is connected to or which console tool is being used. For example, a search query submitted to the search service 122 may interact with the search service 132 (in region B) and search service 134 (in region C) to process a given query. Further, region 120, 130, 140 may include a search index which includes the resource snapshot of the computing resources deployed in the respective region. In one embodiment, each resource snapshot identifies an owner of the corresponding computing resource, e.g., an account or application which deployed the resource. Each resource snapshot may further provide information about the configuration and state of the corresponding computing resource (e.g., whether a VM instance is in a started or stopped state), relationships with other resources (e.g., whether a VM instance is a member of a security group, launched based on an auto scaling event, or what identify and access permissions have been applied to the VM instance), and any tags or other metadata assigned to a computing resource by the account owner (e.g., tags labeling a given VM instance as being a "development" instance used to test updates or changes to software running on other VM instances tagged as being "production"). The search service 122, 132, 143, may process queries with conditions based on the information stored in the resource snapshots.

In one embodiment, the enterprise customer can compose a query by specifying conditions matched against any metadata field indexed as part of the resource snapshot of a given resource type or against any tags assigned to a computing resource. An example of a simple query includes "find VM instances tagged 'development'". Unless otherwise specified, the search service in one region may return results from all regions where a customer has data or deployed resources. Thus, the query of "find VM instances tagged 'development" would return a list of any VM instances 124, 134, and 144 which included this tag, regardless of the particular search service (i.e., search services 122, 132, or 142) the query is submitted to. In addition, the search results could allow the user to access any of the VM instances included in the search results, e.g., by launching a service console and connecting to the appropriate region 120, 130, or 140. As another example, the enterprise customer could compose a more complex query, such as "find all VM instances that are not tagged 'production" in region B and in region C or "find all computing resources in any region that are members of a given security group." Additional examples include identifying users or accounts authorized to access a given computing resource, e.g., identifying the access permissions which have been assigned to a specific user or, conversely, what computing resources is a specific user authorized to access.

Figure 2:
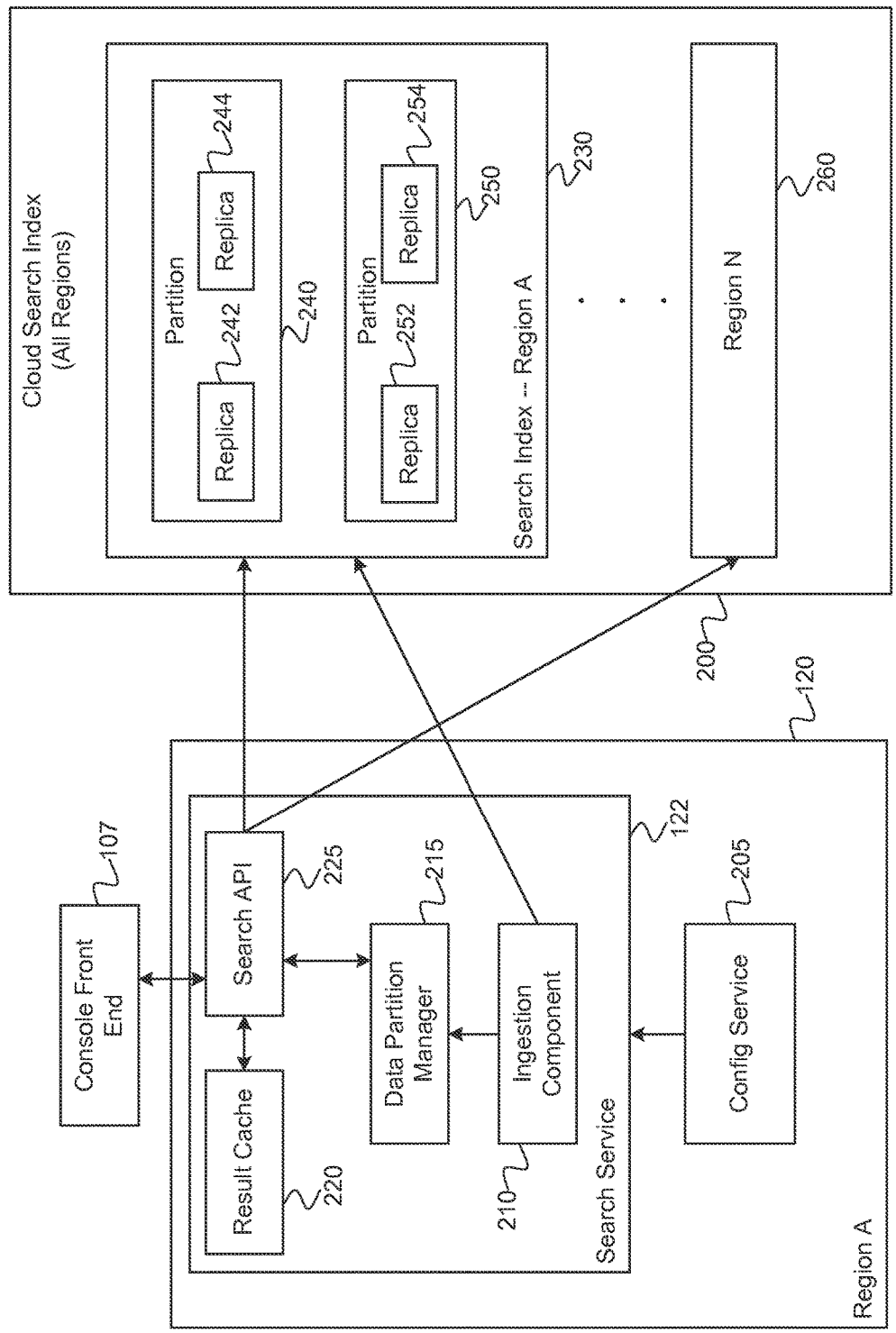
FIG. 2 illustrates a search service used to identify computing resources assoiacted with a common account in multiple regions of a cloud based computing environment, according to one embodiment.

FIG. 2 illustrates a search service used to identify computing resources associated with a common account in multiple regions of a cloud based computing environment, according to one embodiment. As shown, the computing environment includes a cloud search index 200 and the cloud based computing region A 120. In addition, the region A 120 includes the console front end 107, search service 122, and a config service 205.

In one embodiment, the cloud search index 200 includes a search index for each service region offered by a service provider, shown here as search index 230 for region A through search index 260 for region N. The search index for each region (illustrated in FIG. 2 by search index 230 for region A) stores resource snapshot data for each computing resource in that region. While the specific resource data in the cloud search index 200 can be tailored by the service provider for different cloud computing resource types, each resource snapshot generally stores a subset of resource data that is expected to be relevant to conducting searches and displaying a high level overview of a resource. Further, the resource data may be indexed according to a set of fields of each resource type in order to optimize index reads when processing search queries.

In one embodiment, the search service in each region (e.g., search service 122 in region A 120) populates service data (i.e., the resource snapshots) in the corresponding search index for that region (e.g., the search index 230 for region A). Each partition 240, 250 may store resource snapshots for a distinct group of accounts. For example, an account may be assigned to a partition when an account is created. Note however, the assignment of accounts to partitions may be updated as necessary, e.g., to rebalance the relative distribution of resource snapshots across partitions 240, 250, based on the number of resources a collection of accounts have deployed in a given cloud computing region. Similarly, an account associated with a large number of computing resources could be assigned to multiple partitions. Further, the resource snapshots stored by a partition (e.g., partitions 240 and 250) may be copied in multiple replicas (e.g., replicas 242, 244 of partition 240 and replicas 252, 254 of partition 250). Each replica generally includes a copy of the resource snapshots stored by that partition. Using multiple replicas improves both read and write throughput, as each replica can generally be accessed independently of others. In the particular embodiment shown in FIG. 2, each partition includes two replicas; more generally, however, the partitions may include any number of replicas.

To populate the partitions 240, 250 with service data for computing resources in region A 120, an ingestion component 210 of the search service 122 may subscribe to receive a feed of change events from a config service 205. Each change event may identify a change in resource state of a resource in that region (e.g., create, update, or delete events) and the owner of the computing resource. As change event entries are pulled from this feed, the ingestion component 210 queries a data partition manager 215 to determine which partition 240, 250, in the search index 230 contains data for the account that owns the resource identified in the change event. As described in greater detail below, the ingestion component 210 may be configured to write the change event data along with the partition information to a temporary data store managed by the search service 122. Periodically, the ingestion component then writes data from this temporary data store to the appropriate partition 240, 250 in the search index 230. The same general process is repeated by a search service 122 in each cloud computing region.

To query the cloud search index 200, a user submits a query via the console front end 107. In turn, the console front end 107 may invoke services exposed by a search API 225 to process the query. In one embodiment, the search API 225 may query the data partition manager 215 to identify each region in the cloud search index 200 that may store resource snapshots for the account owner associated with the search query. The search API 225 can query the appropriate partition in the search index for each identified region to obtain resource snapshots responsive to the query. That is, the search API 225 only needs to query search indexes for regions in which the corresponding account has deployed any of the computing resources that may be found using the search service 122. In one embodiment, results are stored by the search service 122 in a result cache 220 and passed back to the console front end 107 in subsets (e.g., in paged sets of twenty snapshots per page).

Figure 3:
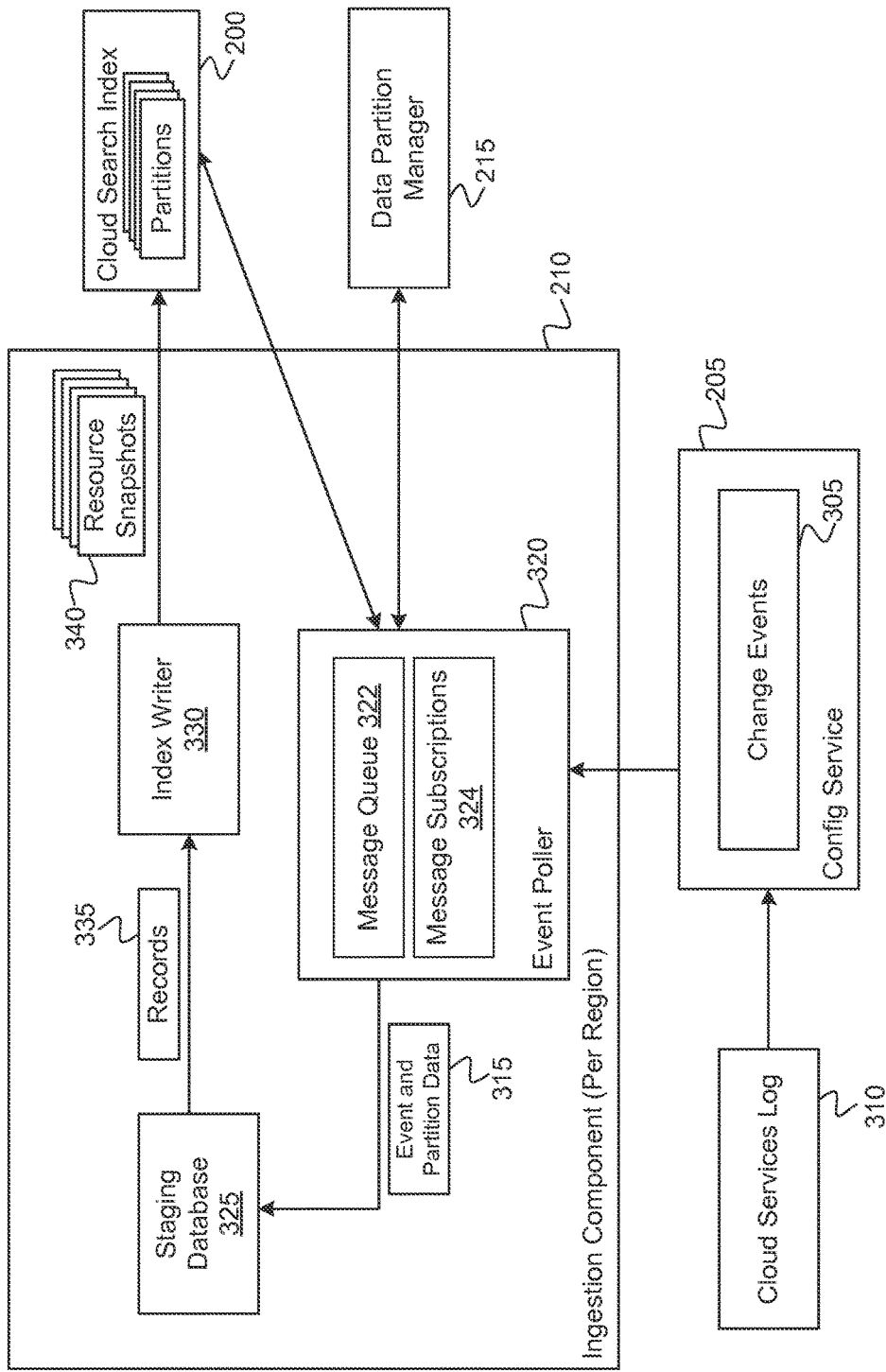
FIG. 3 further illustrates an ingestion component of the search service first illustrated in FIG. 2, according to one embodiment.

FIG. 3 further illustrates an ingestion component 210 of the search service first illustrated in FIG. 2, according to one embodiment. As shown, the ingestion component 210 includes an event poller 320, a staging database 325, and an index writer 330. And the event poller 320 includes a message queue 322 and message subscriptions 324.

In one embodiment, event poller 320 subscribes to a notification service to receive messages published to the notification service by the config service 305. More specifically, the message subscriptions 324 specify what change events 305 published to the notification service should be consumed by the event poller 320. Messages received from the notification service may be stored in message queue 322. In a particular embodiment, the Simple Notification Service (SNS) and Simple Queue Service (SQS) provided by Amazon Web Services may be used.

Messages published by config service 205 may include change events 305 related to computing resources in the cloud computing region covered by the ingestion service 210. For example, a VM instance may be launched, started, or stopped or a VM instance could be assigned to a security group (or the rules of the security group could change), tagged by an account owner with tags, etc. The config service 205 may identify the change events from a cloud service log 310. In one embodiment, the service log 310 may list API calls made to or invoked by services and computing resources in the cloud computing region. When a thread of the event poller 320 consumes a change event 305 published in the message queue 322, the event poller 320 queries the data partition manager 210 to determine which partition in the cloud search index 200 stores data for the account associated with the resource identified in that change event 305. The event poller 320 then writes event and partition data 315 to the staging database 325 for later processing by the index writer 330. That is, the staging database 325 provides a batch record data store for changes events to be written to the search index 200 by the index writer 330.

In one embodiment, the staging database 325 stores a record for each change event 305 keyed to a resource identifier associated with the computing resource referenced in the change event 305. In addition, each record may include a markup language document describing the change to the computing resource that resulted in the change event 305 (e.g., describing a create, update, or delete event related to the resource or describing changes in resource properties, states, relationships, or attributes, etc.). The record 335 may also include a timestamp of the change event 305. Accordingly, the event poller 320 can identify if there is an existing entry in the staging database 325 for the resource identified in the change event 305 which has an older state than what is represented by change event 305 currently being processed by the event poller 320. If either no existing record is present in the staging database 325 for that computing resource or a record exists but has an older timestamp, then the event poller 320 writes the change event 305 to the staging database 325. Otherwise, the event poller 320 discards the change event 305 event currently being processed since it contains older data than is present in the staging database 325.

The index writer 330 is generally configured to write records 335 retrieved from the staging database 325 to a partition in the cloud search index 200. In one embodiment, the index writer 330 includes multiple threads which query the staging database by partition in chronological order to identify records 335 to write to the search index 200. Once a thread in the index writer 330 finds a partition with outstanding records 335, the index writer 330 may mark such records 335 in the staging database 325 as claimed, write a resource snapshot 340 to the search index 200, and then delete the records 335 from the staging database 325. That is, records 335 are not deleted from the staging database 325 until resource snapshots 340 are written (or updated) in the search index 200.

In one embodiment, if after writing a group of records 335 to the search index 200, the thread finds additional records in the staging database 325 that are to be written to the same partition used in the previous write operation, then the thread may claim and write those records as well. If a thread marks records 335 as claimed and does not delete these records within a certain amount of time, a monitoring thread in the staging database 325 may clear the claim as stale. Doing so may occasionally result in two threads writing the same information to the cloud search index 200 (in cases where a first write is successful, but the record 335 is not deleted from the staging database prior to the claim being cleared). This ensures that the process is atomic. Also, if the event poller 320 is unable to write event and partition data 315 to the staging database 325 because an earlier version of the record currently exists in the staging database 325 and has been marked as claimed by a thread of the index writer 330, then a thread of the event poller 320 writing to the staging database 325 may block until either the record 335 is written to search service 200 and deleted from the staging database 325 or update the record in the staging database 325 if the claim on that record is cleared by a monitoring thread.

Figure 4:
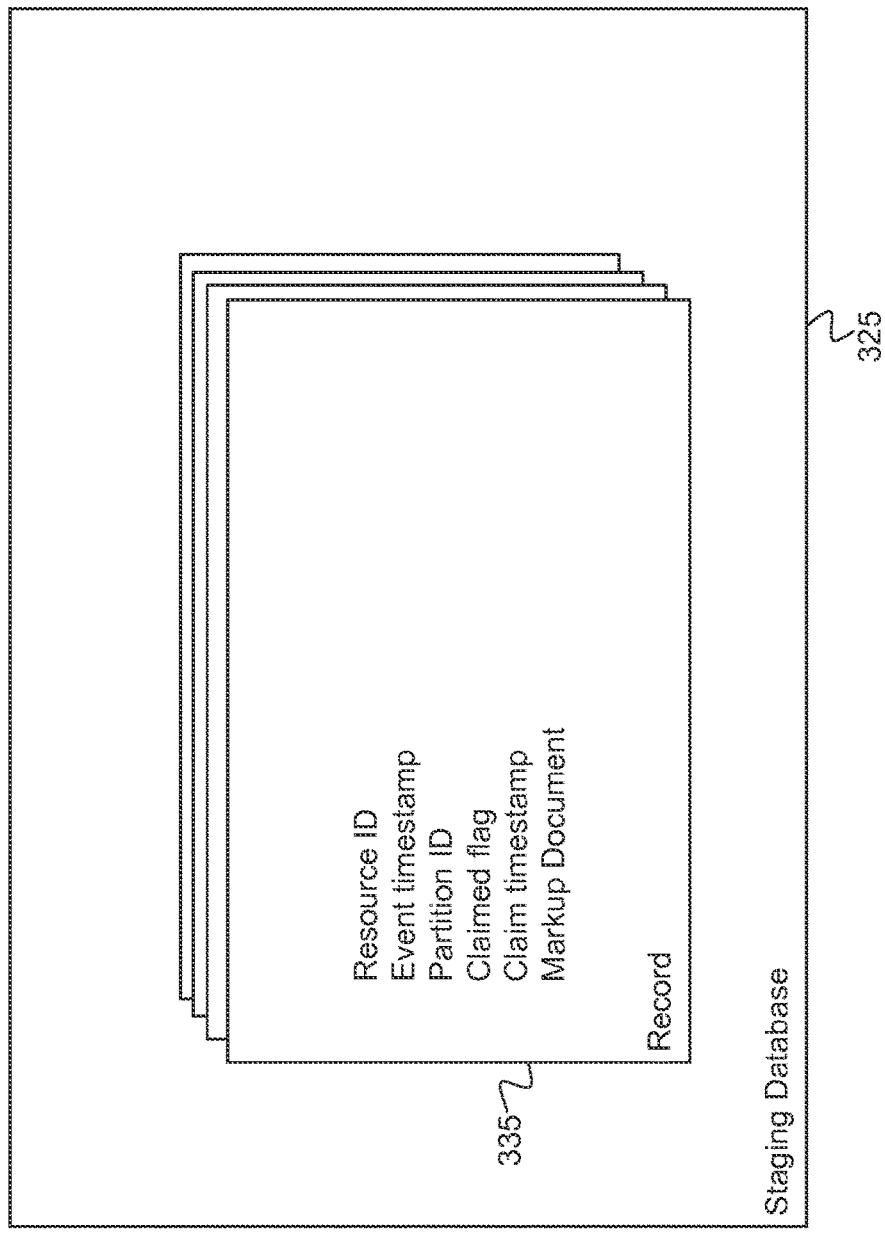
FIG. 4 further illustrates a staging database of the search service first illustrated in FIG. 3, according to one embodiment.

FIG. 4 further illustrates a staging database 325 of the search service first illustrated in FIG. 3, according to one embodiment. As shown, the staging database includes records 335 waiting to be written to the cloud search index. Further, each record 335 may identify a resource ID, an event timestamp, a partition ID, a claimed flag, a claim timestamp, and a markup document. The resource ID provides a unique identifier for the underlying computing resource that is the subject of the record 335. For example, the resource ID may identify a VM instance, data storage resources, an instance of a database service, message queueing services subscriptions or topics, an instance of a load balancing service, an instance of an auto-scaling group, etc. The event timestamp may identify a time when the change event occurred. The event timestamp may be used to deduplicate change events for the same computing resource (based on the resource ID) with different timestamps. For example, if a computing resource triggers ten change events over twenty seconds, then the staging database 325 may ultimately only store only the final state of that computing resource after the event poller processes the ten change events. The partition ID references a partition in the cloud search index which the record 335 should be written to by the index writer. The partition ID allows groups of records destined to be written to the same partition to be written by a thread of the index writer as part of a batch operation. The claimed flag indicates whether a thread of the index writer has picked up the record 335 in order to write the record 335 to the partition referenced by the partition ID. The claim timestamp indicates what time a thread of the index writer claimed the record 335 for writing to the search index. As noted, the index writer may also include monitoring threads which clear "stale" claims based on the claim timestamp. The markup document generally provides resource snapshot data about the computing resource corresponding to the resource ID in record 335. That is, the markup document generally provides a subset of resource data expected to be relevant to conducting searches and to provide a high level overview of a resource in response to a search query.

Figure 5:
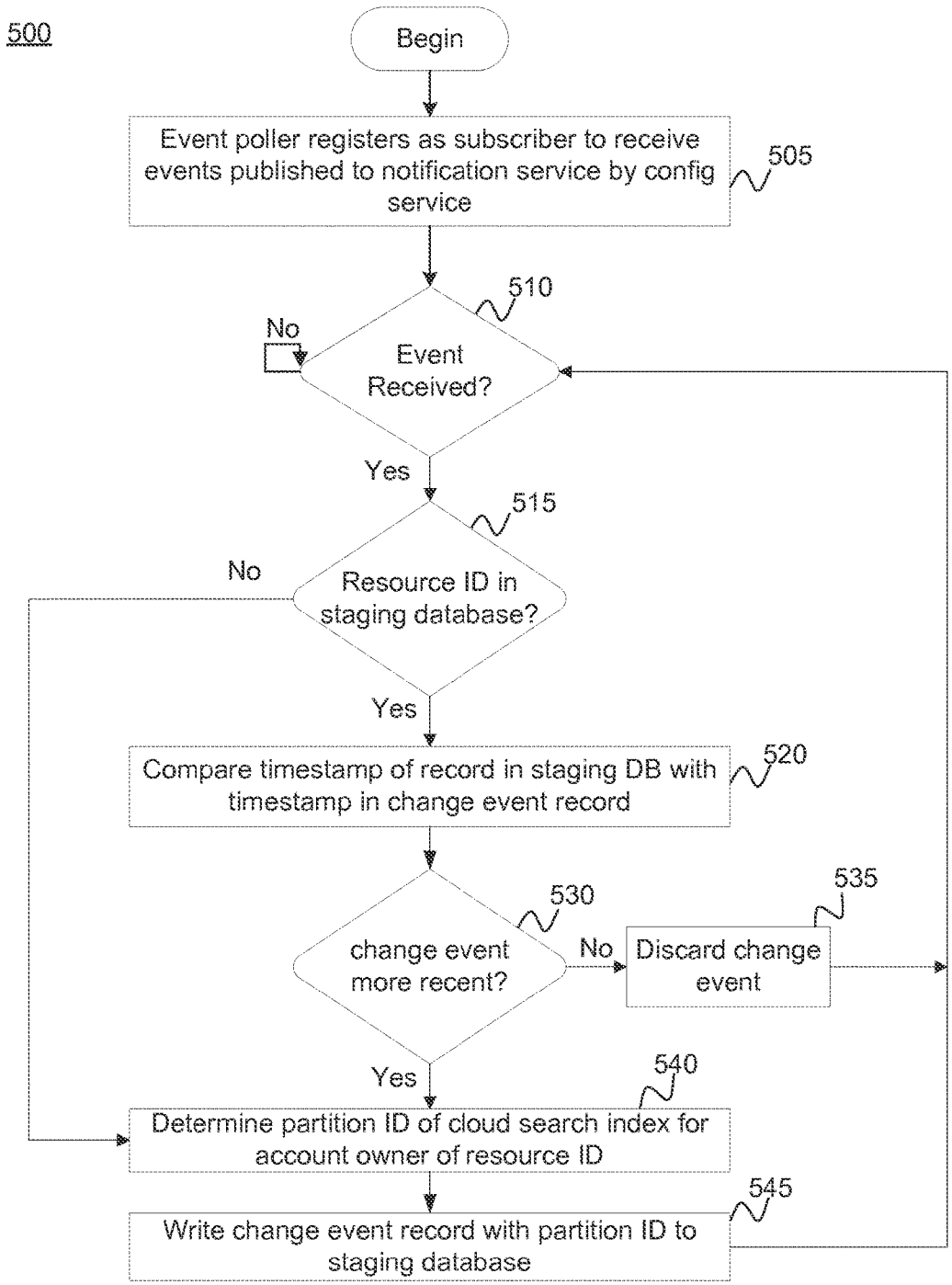
FIG. 5 illustrates a method for writing event data to the staging database of the search service, according to one embodiment.

FIG. 5 illustrates a method 500 for writing change event data to the staging database of the search service, according to one embodiment. As shown, the method 500 begins at step 505 where the event poller subscribes to topics of a notification service. In particular, the event poller may subscribe to receive notifications of change events published to the notification service by a config service. Each such notification may describe a change event for an instance of a computing resource or service deployed to a cloud computing region. For example, a change event may describe create, update, or delete events related to the instance of the computing resource or describe changes to resource properties, states, relationships or attributes, etc. Further, the event poller may maintain a message queue used to store change event notifications for further processing.

At step 510, the event poller waits for a change event notification to be published by the config service for one of the subscribed topics. Once a change event notification is published and received, the event poller determines whether a resource ID in the change event is present in the records of the staging database. If so, then the event poller compares a timestamp in the change event with a timestamp of the record in the staging database (step 520). If the timestamp of the change event is more recent than the timestamp of the record in the database (step 530) or if the resource ID in the change event is not in the staging database (step 515) then the event poller determines a partition ID in the cloud search index for an account owner of the computing resource identified by the resource ID in the change event (step 540). Once the appropriate partition is identified, the event poller writes a change event record and partition ID to the staging database (step 545). If the change event corresponds to the deployment of a computing resource to a new partition (i.e., a partition that does not have any other resources associated with the account owner), then the data partition manager in each region may be updated to reflect the presence of the computing resource in the new region. Similarly, if the change event deletes the only resource deployed by the account owner in a given cloud computing region, then the data partition manager in each region is updated to remove a reference to the account owner as having resources deployed in the given region.

Returning to step 530, if the timestamp of the change event is older than the timestamp already in the staging database for the resource ID, then the event poller discards the change event and the method 500 returns to step 510 where event poller waits until the next change event is published by the change notification service and available to process.

Figure 6:
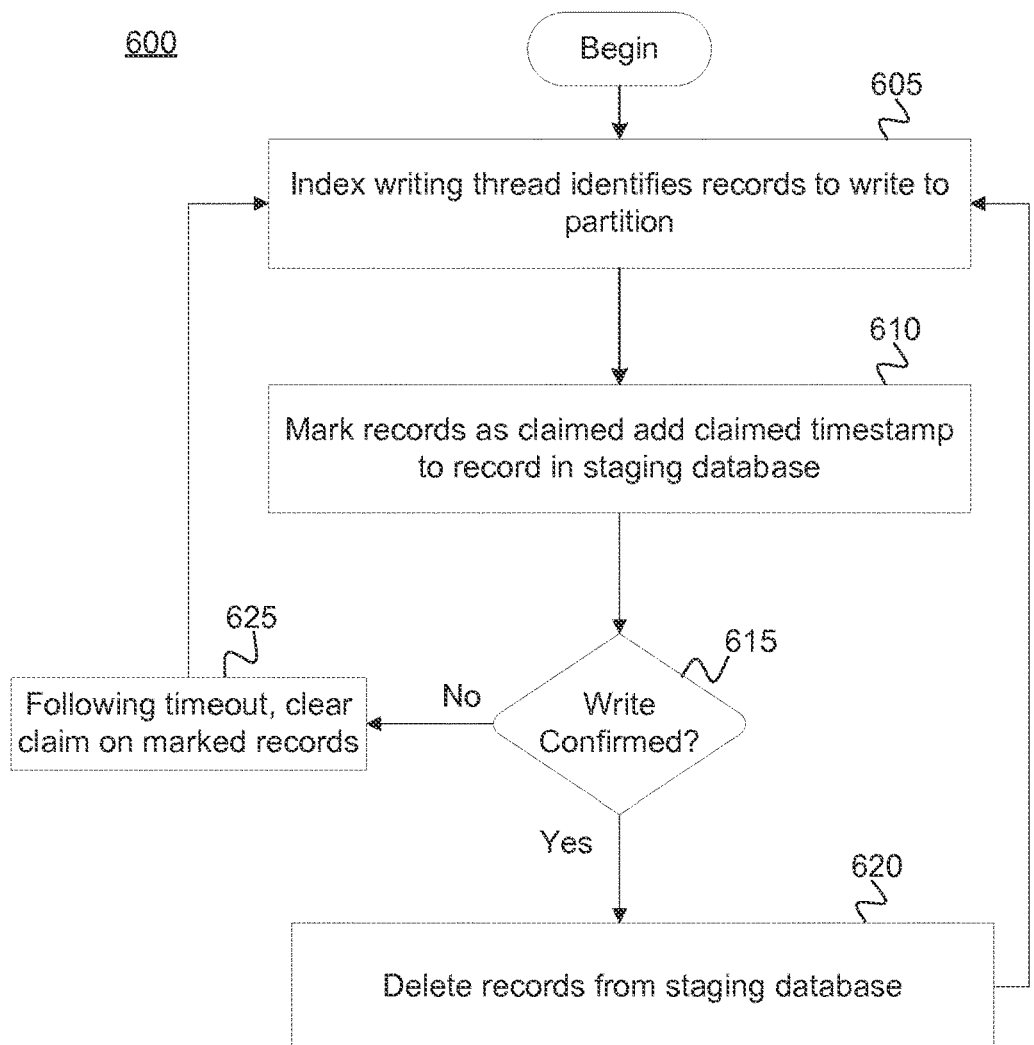
FIG. 6 illustrates a method for writing data from the staging database to a partition of the index search service, according to one embodiment.

FIG. 6 illustrates a method 600 for writing data from the staging database to a partition of the index search service, according to one embodiment. As shown, the method 600 begins at step 605, where an index writing thread of the search service identifies one or more records to write to a partition of the search index. As described, the search index includes resource snapshots for the computing resources deployed in a given computing cloud region hosted by a cloud computing service provider. At step 610, the index writing thread retrieves the records identified at step 605 and marks the records in the staging database as being claimed by the thread for writing to the search index. In addition, the thread may write a claim timestamp into the marked records of the staging database. At step 615, if the write is successfully performed, then the index writing thread deletes the records from the staging database. Otherwise, once a monitoring thread may later determine that the claim on the marked records has become stale (or if the write simply fails), then a status flag in each of the one or more records indicating a status as being claimed for writing by an index thread is cleared. Doing so results in an index thread subsequently identifying the same records as being available in the staging database as needing to be written to the search index.

Figure 7:
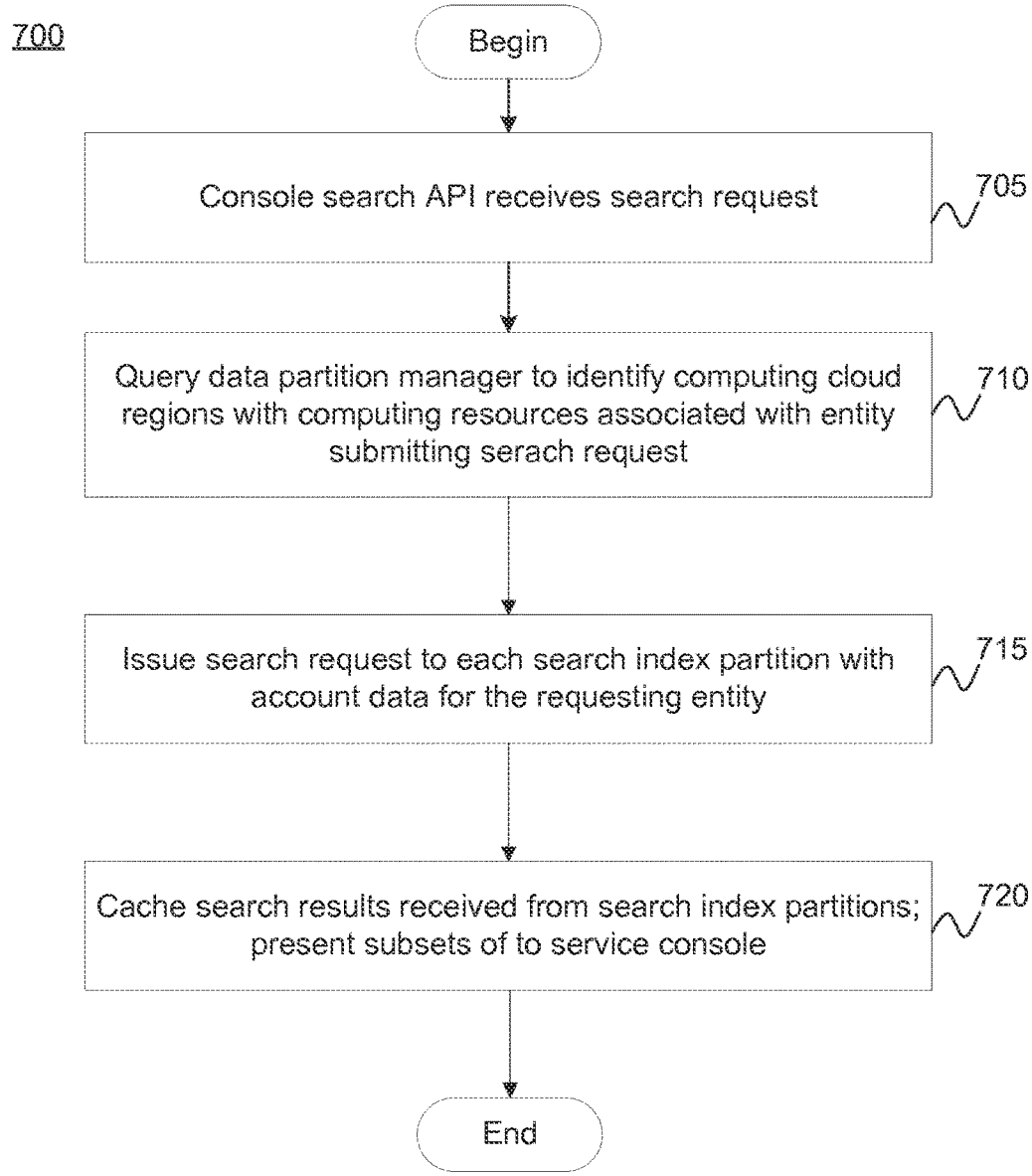
FIG. 7 illustrates a method for identifying account level computing resources using the search service illustrated in FIG. 2, according to one embodiment.

FIG. 7 illustrates a method 700 for identifying account level computing resources using the search service illustrated in FIG. 2, according to one embodiment. As shown, the method begins at step 700, where a console search API receives a search request directed to the cloud search index. As noted, the search query may identify a common user or enterprise account associated with a variety of virtualized computing resources (e.g., virtual machine instances) and service instances (e.g., load balancing, auto-scaling, database and storage service resources) which may have been deployed by the user or enterprise account across multiple regions hosted by the cloud computing service provider. In addition, the search query may identify regions to include (or exclude) in processing the search request along with other conditions used to determine a result set, tags assigned to computing resources, relationships with other resources, etc., as well as combinations or conditions related to the individual resources, cloud computing regions, tags or other metadata.

At step 710, the search API queries a partition manager to identify which regions of the cloud computing service provider may have computing resources or service instances associated with the user or enterprise account identified in the request. The search API may also identify which partition in each search index has been designated to store resource snapshots of computing resources associated with the user or enterprise account. At step 715, the search API then issues a search request to a search index partition for each cloud computing region identified at step 710. At step 720, the search API caches search results received from the regions and makes the search results available to the service console. For example, as noted above, the search API may store the results in a result cache and pass subsets of the results to the requesting entity. Such results may include data retrieved from the search index as well as allow a reviewing user to invoke APIs to interrogate a selected computing resource directly or to launch the appropriate service front end associated with a selected computing resource.

Figure 8:
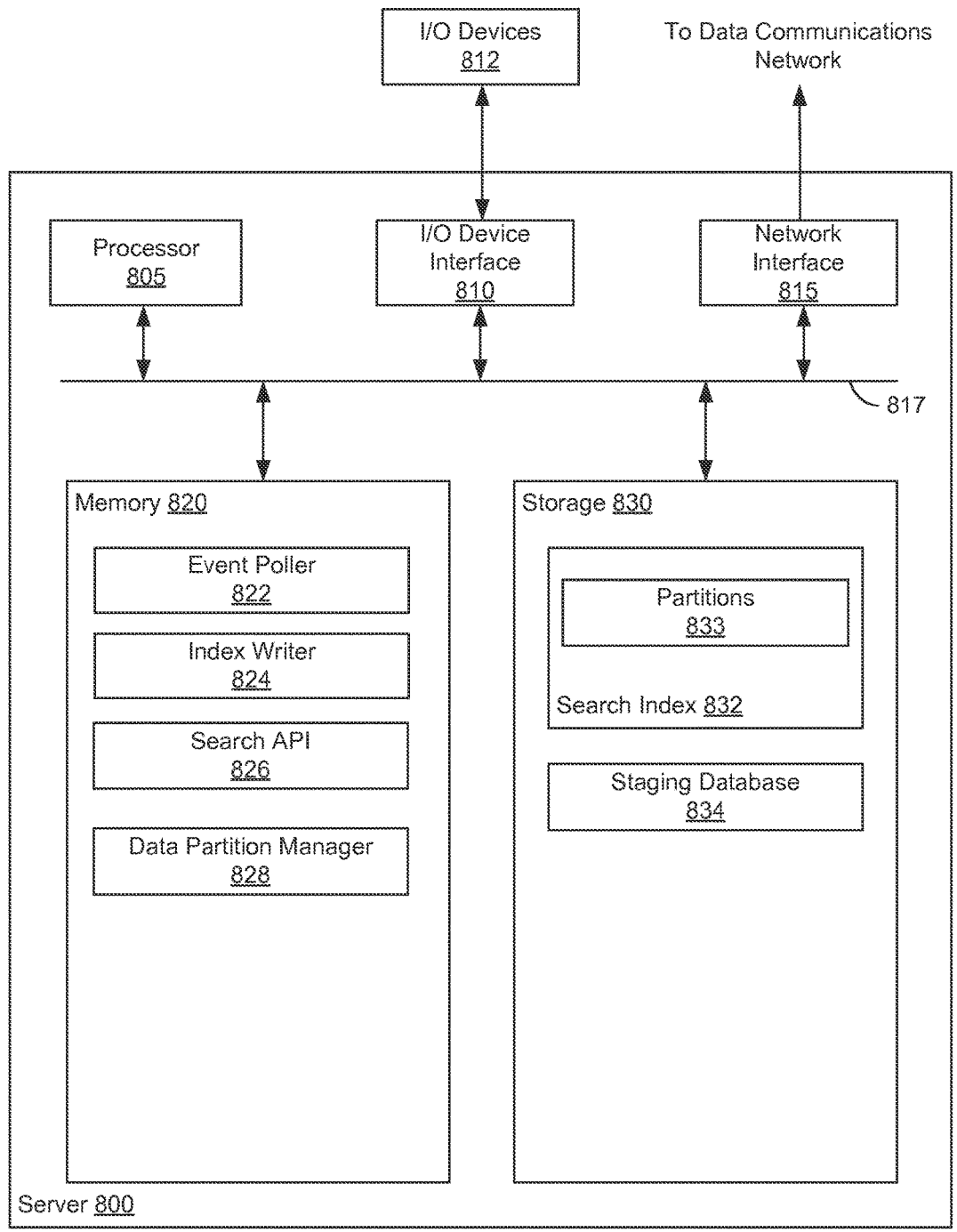
FIG. 8 illustrates an example computing system used to host components of the search service illustrated in FIG. 2, according to one embodiment.

FIG. 8 illustrates an example computing system 800 used to host components of the search service illustrated in FIG. 2, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. In context of this disclosure, the computing elements shown in computing system 800 may correspond to a physical computing system (e.g., a system in a data center) or may be a virtual computing instance executing within a computing cloud. Further, while shown as running on a single computing server 800, components in memory 820 and storage 830 may be deployed across multiple computing servers.

The CPU 805 retrieves programming instructions and application data stored in the memory 820 and storage 830. The interconnect 817 is used to transmit programming instructions and application data between the CPU 805, I/O devices interface 810, storage 830, network interface 815, and memory 820. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes an event poller 822, an index writer 824, a search API 826, and a data partition manager 828, and the storage 830 includes a search index 832 and staging database 834. As described, the event poller 822 may subscribe to receive event change notifications related to changes in resources deployed by end users to computing clouds hosted by a service provider. The event poller 822 may write event change notifications, and partition data determined to the staging database 834. The partition data may be determined by the data partition manager 828. In turn, the index writer 824 may batch records from the staging database 834 and write the records to the partition 833 in the search index 832, as identified by the record in the staging database. As described, a resource snapshot written to a partition 833 in the search index 832 stores a subset of resource data relevant to conducting searches and providing an end-user with a high level overview of a given computing resource. To execute a search, an end user may interact with a management console (or custom application) to submit a search request to the search API 826. In response, the search API 826 identifies what partitions have resource snapshots associated with that end-user's computing fleet within one or more cloud computing regions hosted by the cloud computing service provider and executes a query against each such region to identify computing resources that satisfy the search query.

Advantageously, embodiments discussed above provide a multi-region search service which allows an account owner to efficiently and effectively identify cloud based computing resources across multiple services and across multiple independent cloud computing regions in which services are deployed. The search service allows an account owner to submit search queries (such as simple free text or structured conditions) which are evaluated across all of the cloud based services in all regions hosted by a service provider to identify a set of computing resources instantiated (or otherwise controlled) by the account owner. To maintain the search index, the search service may include an event poller which deduplicates change events written to a staging database. In turn, an index writer performs batch updates to partitions of the search index using records pulled from the staging database. A data partition manger allows the search service in one region to identify what other regions (and search index partitions) need to be queried to identify resources associated with an account.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium storing instructions executable to perform an operation for providing a search service usable for computing resource identification, the operation comprising:

subscribing to a message notification service for computing resource deployments in a first cloud computing region of a plurality of cloud computing regions;

receiving, from the message notification service, a notification of a change event pertaining to a computing resource deployed in the first cloud computing region, the notification identifying: the computing resource, an owner of the computing resource and change event data associated with the computing resource;

identifying, in a first search index associated with the first cloud computing region, a partition configured to store a resource snapshot of the computing resource;

identifying an existing record associated with the computing resource in a staging database;
determining, by operation of a processor when executing the instructions, that the change event has a newer associated timestamp than the existing record associated with the computing resource in the staging database; and
writing, to the staging database, a new record representing the change event, wherein the new record identifies at least the computing resource, the identified partition, and the change event data;
retrieving, from the staging database, a plurality of records identifying the same partition in the first search index, the plurality of records including the new record; and
writing the retrieved plurality of records to the identified partition in the first search index, wherein the first search index is of a plurality of search indices usable by the search service, each search index corresponding to a respective one of the plurality of cloud computing regions.

2. The non-transitory computer-readable medium of claim 1, wherein the notification is published to the message notification service by a config service and wherein the config service parses a log of API calls to for the in the first cloud computing region to identify the change events published to the message notification service.

3. The non-transitory computer-readable medium of claim 1, wherein the operation further comprises:
receiving a search query requesting to identify of resource snapshots associated with the owner, wherein the owner is identified by the search query;
identifying one or more of the plurality of cloud computing regions which include computing resources associated with the owner identified in the search query;
identifying, in a respective search index associated with each identified cloud computing region, any resource snapshots that satisfy the search query; and
returning, as a response to the search query, one or more resource snapshots satisfying the search query, the one or more resource snapshots including the resource snapshot.

4. The non-transitory computer-readable medium of claim 1, wherein the computing resource is of a plurality of computing resources deployed in the plurality of cloud computing regions, wherein the plurality of computing resources includes one or more of instances of each computing resource type selected from virtual machines (VM), data storage resources, database services, message notification services, message queueing services, load balancing services, and auto-scaling group services.

5. The non-transitory computer-readable medium storing instructions of claim 1, wherein the instructions are configured to:
discard the notification upon determining that the change event data has an older associated timestamp than the existing record associated with the computing resource in the staging database.

6. A system to process a search request, the system comprising:
a processor; and
a memory storing instructions for implementing a search service, wherein the instructions, when executed on the processor, cause the processor to perform an operation comprising:
receiving a notification of a change event pertaining to a computing resource deployed in a cloud computing region hosting the search service, wherein the notification identifies the computing resource and change event data associated with the computing resource;
determining that the change event has a newer associated timestamp than an existing record associated with the computing resource in a staging database;
writing, to the staging database, a new record representing the change event;
updating a search index associated with the cloud computing region, based on the new record in the staging database;
receiving the search request, which specifies a first account;
determining a plurality of cloud computing regions in which one or more computing resources associated with the first account, including the computing resource, have been deployed, wherein each of the plurality of cloud computing regions has a respective search index, of a plurality of search indices, storing resource snapshots of that cloud computing region; and
accessing the plurality of search indices of the plurality of cloud computing regions, including the updated search index, in order to identify a resource snapshot of the computing resource as satisfying the search request.

7. The system of claim 6, wherein the one or more computing resources include one or more of instances of each computing resource type selected from virtual machines (VM), data storage resources, database services, message notification services, message queueing services, load balancing services, auto-scaling group services, security group services, and identity and access management configurations.

8. The system of claim 6, wherein the instructions, when executed, cause the processor to access the plurality of search indices of the plurality of cloud computing regions to identify any resource snapshots satisfying the search request comprises identifying any resource snapshots associated with the account that satisfy one or more conditions specified in the search request.

9. The system of claim 6, wherein the search request specifies one or more conditions for computing resource identification, the one or more conditions including at least one of: one or more cloud computing regions to either exclude or include in processing the search request, one or more computing resource tags, and a resource group membership.

10. The system of claim 6, wherein the notification further identifies the first account associated with the computing resource identified in the notification, wherein updating the search index comprises updating a partition of the search index.

11. The system of claim 6, wherein at least a first search index of the plurality of search indices includes a plurality of partitions and wherein each partition stores resource snapshots for a distinct group of accounts.

12. The system of claim 11, wherein at least a first partition of the partitions includes one or more replicas, wherein each replica stores a copy of the resource snapshots stored by the first partition.

13. The system of claim 6, wherein the operation further comprises:
receiving a selection of a resource snapshots satisfying the search request; and accessing the computing resource based on at least a resource identifier associated with the selected resource snapshot.

14. The system of claim 6, wherein the search service is hosted by a first cloud computing region of the plurality of cloud computing regions and wherein determining the plurality of cloud computing regions in which the one or more computing resources associated with the account have been deployed comprises querying a data partition manager hosted in the first plurality of computing regions to identify the plurality of cloud computing regions, wherein the plurality of cloud computing regions is a subset of regions listed in the data partition manager.

15. The system of claim 6, wherein each of the plurality of cloud computing regions hosts a respective instance of the search service.

16. A computer-implemented method to process a search request, the computer-implemented method comprising:

receiving, by a first search service hosted in a first cloud computing region of a plurality of cloud computing regions, a notification of a change event pertaining to a computing resource deployed in the first cloud computing region, the notification identifying: the computing resource, an account associated with the computing resource, and change event data associated with the computing resource;

determining that the change event has a newer associated timestamp than an existing record associated with the computing resource in a staging database;

writing, to the staging database, a new record representing the change event; and updating a search index associated with the first cloud computing region, by operation of a processor and based on a plurality of records retrieved from the staging database, the plurality of records including the new record, wherein each of the plurality of cloud computing regions has a respective search index storing resource snapshots of that cloud computing region;

receiving, by the first search service, the search request for identifying associated computing resources of the account, wherein the account is specified in the search request;

determining two or more cloud computing regions of the plurality of the cloud computing regions in which at least one computing resource, associated with the account specified in the search request and including the computing resource, has been deployed; and accessing the search indices of the two or more cloud computing regions in order to identify a resource snapshot of the computing resource as satisfying the search request.

17. The computer-implemented method of claim 16, wherein the operation further comprises:

identifying a partition in the search index designated to store resource snapshots associated with the account specified in the search request, wherein the written new record identifies at least the computing resource, the identified partition, and a document describing the change event data;

wherein updating the search index comprises:

retrieving, from the staging database, the plurality of records, which each identify a same partition in the first search index; and writing the retrieved plurality of records to the identified partition in the first search index.

18. The computer-implemented method of claim 17, wherein the partition includes one or more replicas, wherein each replica stores a copy of the resource snapshots stored by the partition.

19. The computer-implemented method of claim 16, wherein the computing resource is of a plurality of computing resources associated with the account, wherein the plurality of computing resources is deployed across the plurality of cloud computing regions and includes one or more of instances of each computing resource type selected from virtual machines (VM), data storage resources, database services, message notification services, message queueing services, load balancing services, and auto-scaling group services.

20. The computer-implemented method of claim 16, further comprising:

receiving a selection of the resource snapshot satisfying the search request; and accessing the computing resource based on at least a resource identifier associated with the selected resource snapshot.

* * * * *

UNITED STATES PATENT AND TRADEMARK OFFICE
CERTIFICATE OF CORRECTION

PATENT NO. : 10,528,627 B1
APPLICATION NO. : 14/852448
DATED : January 7, 2020
INVENTOR(S) : Devlin Roarke Campbell Dunsmore Page 1 of 1

It is certified that error appears in the above-identified patent and that said Letters Patent is hereby corrected as shown below:

In the Claims

In Column 13, Line 30, in Claim 3, after "identify" delete "of".

Signed and Sealed this
Second Day of June, 2020

Andrei Iancu
*Director of the United States Patent and Trademark Office*